(No Model.)

E. STORM.
SPRING VEHICLE.

No. 382,443. Patented May 8, 1888.

Witnesses
Geo. Wadman
M. J. Roach

Inventor,
E. Storm.
By his att'y
Gifford & Brown

UNITED STATES PATENT OFFICE.

EDWARD STORM, OF POUGHKEEPSIE, NEW YORK, ASSIGNOR TO THE EDWARD STORM SPRING COMPANY, (LIMITED,) OF SAME PLACE.

SPRING-VEHICLE.

SPECIFICATION forming part of Letters Patent No. 382,443, dated May 8, 1888.

Application filed October 31, 1887. Serial No. 253,823. (No model.)

*To all whom it may concern:*

Be it known that I, EDWARD STORM, of Poughkeepsie, in the county of Dutchess and State of New York, have invented a certain new and useful Improvement in Wheeled Vehicles, of which the following is a specification.

My improvement relates to the springs and the parts coacting therewith to support the bodies of wagons, carriages, and wheeled vehicles generally from the axles of the wheels.

I will describe my improvement in detail, and then point out the novel features in the claim.

Figure 1:
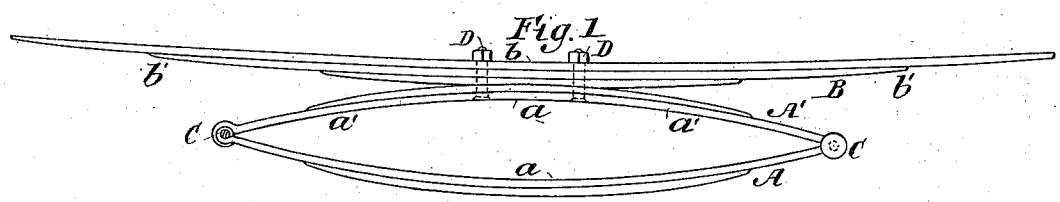
Figure 2:
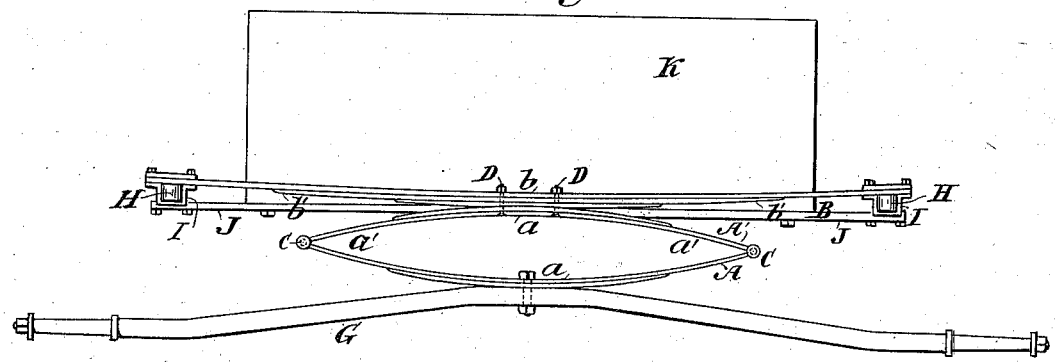
Figure 3:
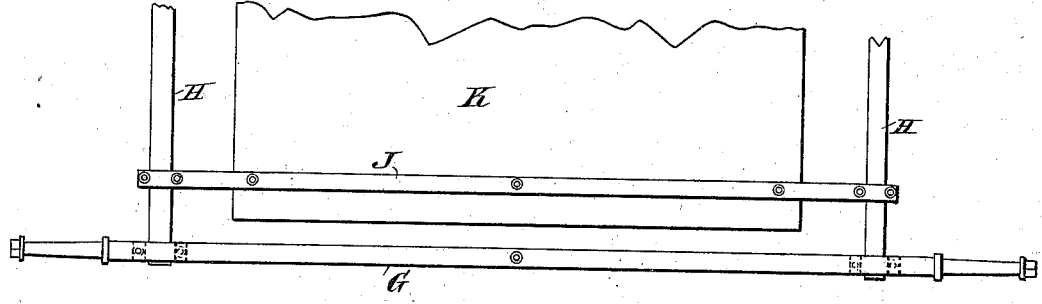
Figure 4:
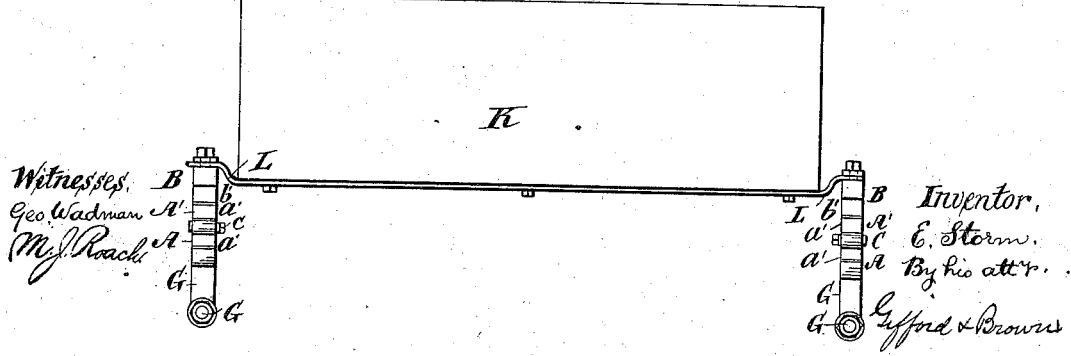

In the accompanying drawings, Figure 1 is a view of a combination of springs forming part of my improvement. Fig. 2 is a front elevation illustrating the application of the combination of springs shown in Fig. 1 to a side-bar wagon. Fig. 3 is an inverted plan of the parts shown in Fig. 2. Fig. 4 is a view showing the application of the combination of springs shown in Fig. 1 to another kind of wagon.

Similar letters of reference designate corresponding parts in all the figures.

A A' designate a spring consisting, essentially, of two sections, A A', which are at a considerable distance apart in the middle and converge toward the ends, where they are hinged together. Each section may be composed of any desirable number of leaves. The hinged connections may be formed by combining the ends of the principal leaves of the sections in a circular frame, one outside the other, and passing bolts C through them. This spring is of the kind ordinarily termed an "elliptic spring." The sections A A' of this spring extend into contact or close proximity to each other at the ends just inward of where said sections bend into circular form around the bolts C.

B designates another spring composed of any desirable number of leaves. It is of the kind known as a "semi-elliptic spring." This spring B is in this instance considerably longer than the spring A A'; but its length may be varied.

The spring B is provided with a seat, *b*, adapting it to be supported throughout quite a considerable portion of its length midway between the ends upon the upper section, A', of the spring A A'. In order that this result may be obtained, the seat is made concave to correspond with the convexity of the adjacent surface of the upper section A' of said spring A A'. As shown, the seat *b* is formed in the lower leaf of the spring B. It may be thus made in any suitable manner—as, for instance, by grinding out the bottom surface of the lower leaf of the spring B to the desired shape. The seat *b* may be maintained in contact with the upper section A' of the spring A A' by means of bolts D, passing through holes or by any suitable means.

The upper section A of the spring A A' may be provided with a seat of the character described, and the spring B will then be left of the ordinary form for a semi-elliptic spring.

One set or combination of springs A A' and B' is shown as arranged between each axle G of a wagon and the wagon-body. As shown in Figs. 2 and 3, these sets or combinations of springs are arranged between the axles and side bars, H, the wagon-body K being supported on the side bars. In Fig. 4, however, the springs are shown as connected to the wagon-body independently of side bars.

Referring now particularly to Figs. 2 and 3, I will state that in the sets or combinations of springs which are over the rear axle the lower section A of the spring A A' is secured to that axle by clips passing around the axle; but in the sets or combinations of the springs arranged over the front axle the lower section A of the spring A A' is secured by a bolt passing through it and this axle. This is illustrated in Fig. 2.

I desire to call particular attention to the fact that the side bars, H, are not arranged above the springs B, but are arranged below the ends of the springs B, and are secured thereto by clips I, which pass around the side bars and extend to the springs B, or by screws or nuts or other suitable means. It is of great advantage to secure the side bars to the springs B below the said springs, because this admits of lowering the wagon-body considerably.

The wagon-body is shown as having connected to it straps J, made of metal or other appropriate material, and fastened at the ends to the side bars.

In Fig. 4 I have shown body-loops L, connected to the wagon-body K, and secured by clips or otherwise to the springs B.

Owing to the extended seat which the springs B have upon the springs A A', the tendency of the wagon-body to vibrate or sway laterally during the travel of the wheels over uneven ground is lessened.

I may provide upon the axles seats for the lower section A of each spring A A' corresponding in character with the seat with which each spring B is provided, so as to guard against the rocking.

The springs B, especially when made considerably longer than the springs A A', may perform to a greater extent the resilient or yielding functions of the combined spring, while the short and stiff springs A A' offer the chief resistance to the strain. Each therefore complements the other in such manner as to render the combined spring free, easy, elastic, and durable.

The springs A A' cushion the springs B, and the whole combination of springs produce a very easy and steady wagon.

When the sections of the springs A A' are subjected to weight, they are forced into more intimate contact near the bolts C, and more or less of their surfaces will be forced into contact as the weight or the force of the weight varies.

What I claim as my invention, and desire to secure by Letters Patent, is—

The combination, with the axle of a wagon or other vehicle and a body or side bars supporting a body, of an elliptic spring supported by the axle, and a semi-elliptic spring, one of said springs having a concave seat at the central portion conforming to the adjacent convex portion of the other spring, said springs extending transversely to the length of the body of the wagon or other vehicle, substantially as specified.

EDWARD STORM.

Witnesses:
K. L. BRENNAN,
JENNIE GREER.